(12) United States Patent
Fletcher et al.

(10) Patent No.: US 6,736,743 B2
(45) Date of Patent: May 18, 2004

(54) BELT INSTALLATION TOOL

(75) Inventors: Barry Fletcher, Belle River (CA); Mark Anthony Muscat, Windsor (CA); Joel Patrick Musyj, Amherstburg (CA); Christian Joseph Schmutz, LaSalle (CA); John M. Shaw, White Lake, MI (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 10/054,838

(22) Filed: Jan. 22, 2002

(65) Prior Publication Data

US 2003/0139239 A1 Jul. 24, 2003

(51) Int. Cl.[7] .............................. F16H 7/12; B66F 3/08
(52) U.S. Cl. ....................... 474/134; 474/130; 474/132; 254/100; 254/131
(58) Field of Search .................. 474/112, 118, 474/114, 102, 133, 134, 135, 109, 117, 63, 125, 132; 254/100, 237, 354.3, 131, 183, 398, 415

(56) References Cited

U.S. PATENT DOCUMENTS

| 1,301,026 A | * | 4/1919 | Yeaton ........................ 474/63 |
| 1,723,970 A | * | 8/1929 | Jauch ........................ 254/100 |
| 1,914,908 A | * | 6/1933 | Buckley ..................... 474/132 |
| 2,425,476 A | * | 8/1947 | Lade et al. .................. 474/134 |
| 3,325,095 A | * | 6/1967 | Mueller et al. ............. 254/100 |
| 3,679,176 A |   | 7/1972 | Campbell .................... 254/54 |
| 3,869,934 A |   | 3/1975 | Pierce |
| 3,920,219 A | * | 11/1975 | Hendrix, Jr. ................ 254/100 |
| 4,069,719 A | * | 1/1978 | Cancilla ..................... 474/134 |
| 4,240,611 A | * | 12/1980 | Bartlett ....................... 254/237 |
| 4,244,559 A |   | 1/1981 | Mote .......................... 254/129 |
| RE30,842 E | * | 1/1982 | Speer |
| 4,380,326 A |   | 4/1983 | Marzorati et al. .......... 254/131 |
| 4,437,648 A |   | 3/1984 | Thorn et al. ................ 254/93 R |
| 4,479,660 A | * | 10/1984 | Pattison ..................... 474/134 |
| 4,500,303 A | * | 2/1985 | Sermersheim et al. ....... 474/112 |
| 4,571,223 A | * | 2/1986 | Molloy ....................... 474/133 |
| 4,622,024 A | * | 11/1986 | Lawson ...................... 474/102 |
| 4,767,383 A | * | 8/1988 | St. John ...................... 474/133 |
| 5,141,475 A | * | 8/1992 | Sajczvk et al. ............. 474/135 |
| 5,318,479 A |   | 6/1994 | Lawroski .................... 474/130 |
| 5,569,106 A | * | 10/1996 | Splittstoesser et al. ....... 474/125 |
| 5,653,654 A |   | 8/1997 | Davis .......................... 474/119 |
| 5,725,200 A | * | 3/1998 | Gordon ....................... 254/398 |
| 6,090,001 A | * | 7/2000 | Cantwell ..................... 474/135 |

* cited by examiner

Primary Examiner—Marcus Charles
(74) Attorney, Agent, or Firm—J. A. Thurnau, Esq.; C. H. Castleman, Esq.; S. G. Austin, Esq.

(57) ABSTRACT

A belt installation tool. The tool comprises a pair of arms connected at a pivot. Each arm has an end for engaging a pulley axle. A handtool is engaged with an arm. By a torque applied with the handtool through a short arcuate motion to the arms, the pulleys are moved apart, thereby tensioning a belt. A locking member or linkage is available to fix the arms in a predetermined position.

10 Claims, 3 Drawing Sheets

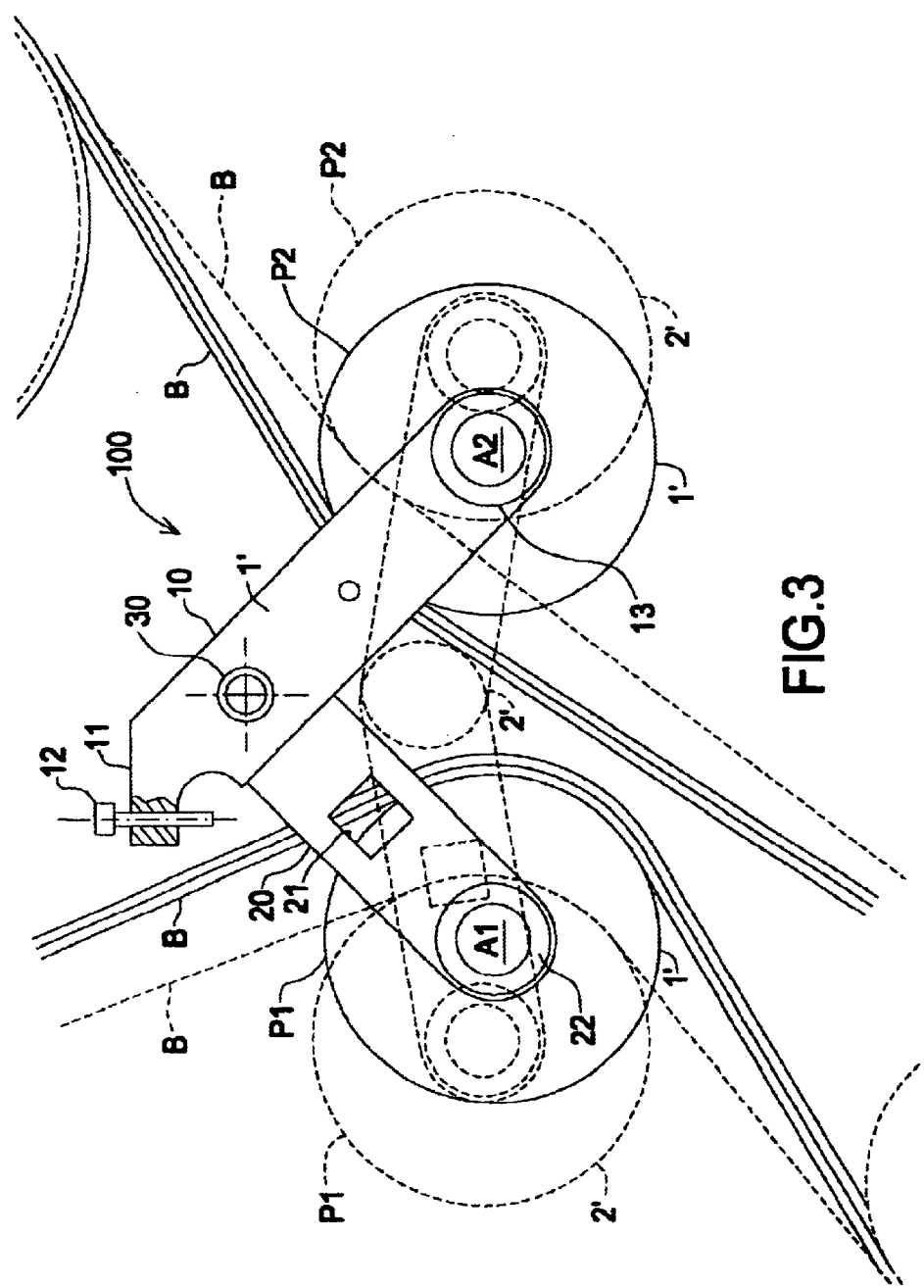

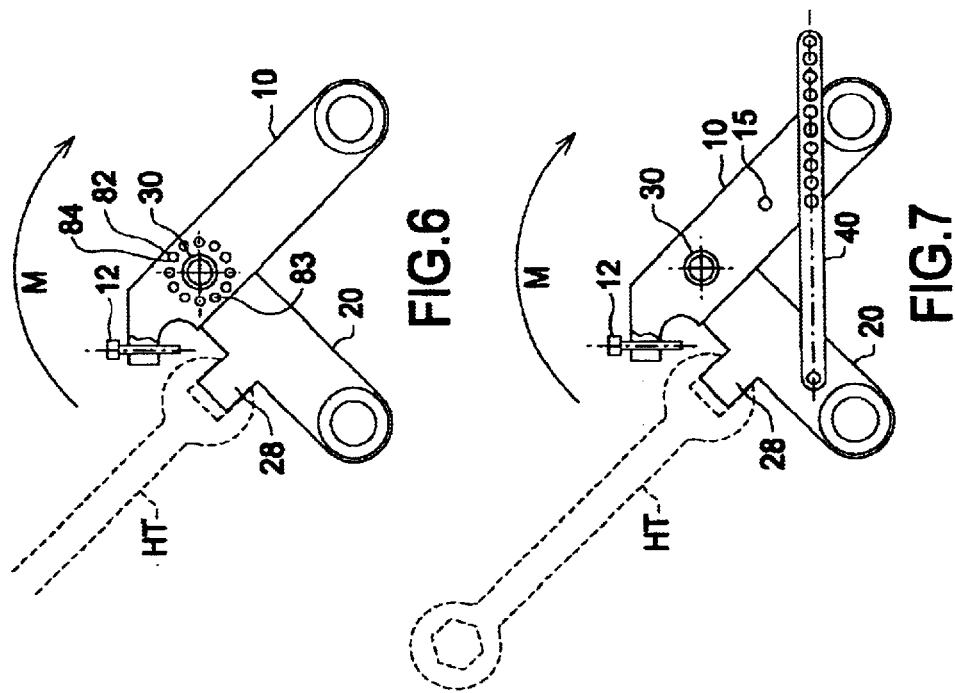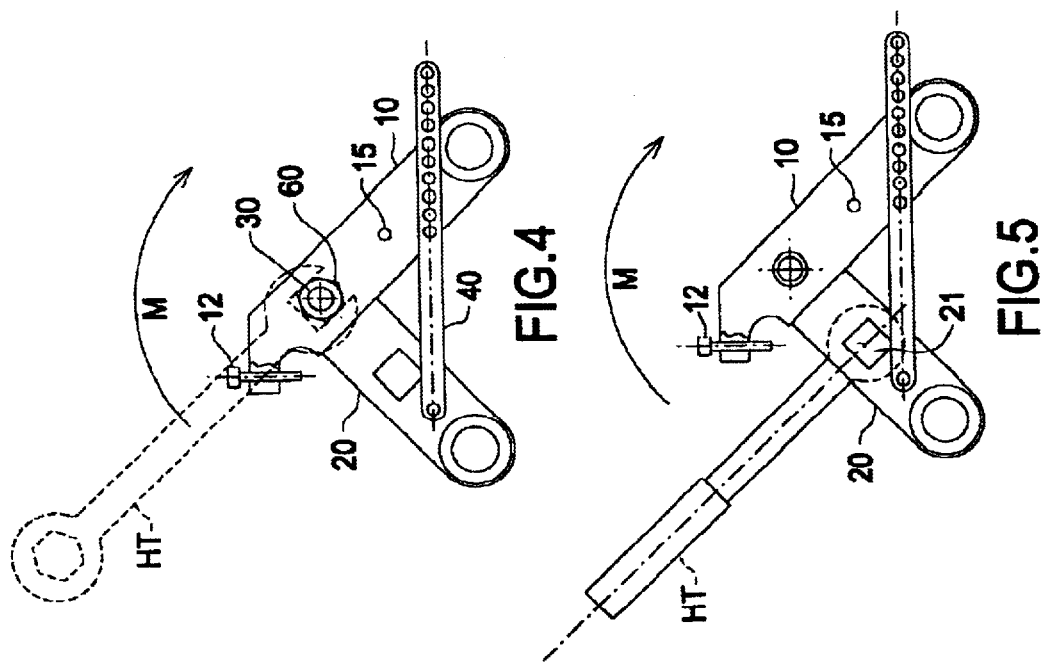

BELT INSTALLATION TOOL

FIELD OF THE INVENTION

The invention relates a belt installation tool, and more particularly to a belt installation tool having means for simultaneously adjusting a position of two pulleys to install or de-install a belt.

BACKGROUND OF THE INVENTION

Belt drives generally comprise a belt entrained between two or more pulleys. The belt generally operates at a predetermined operating tension. To achieve a predetermined operating tension, a belt may be installed about the pulleys in a slack condition. A center of one or more pulleys is then moved, thereby introducing the desired tension into the belt.

Prior art tools are available to install and tension a drive belt. One prior art device operates on a screw principle. The screw is turned, thereby moving a means of spacing apart one or more pulleys.

Representative of the art is U.S. Pat. No. 3,679,176 (1972) to Campbell which discloses a belt tightening tool having a screw bar adjustment and consisting of a pair of pulley saddles for bearing against the grooves of opposite pulleys whereby an interval between the pulley saddles is expanded and contracted.

The prior art tools are complex and have the disadvantage of relatively large size. The complexity and large size limits the belt drive configurations in which the tool may be used. Further, the prior art tools require a particular pulley configuration so that an appropriate tool portion can properly engage the pulleys to be adjusted. Also the prior art tools require a continued effort to use because of the screw operating principle. This eliminates any opportunity for quick use of the prior art tools in a confined space.

What is needed is a belt installation tool having a compact size. What is needed is a belt installation tool having means for simultaneously adjusting a position of two pulleys by applying a torque to an arm. What is needed is a belt installation tool having means for simultaneously adjusting a position of two pulleys by applying a torque to an arm through a short arcuate motion. What is needed is a belt installation tool having a linkage to fix a tool position and thereby a pulley position. The present invention meets these needs.

SUMMARY OF THE INVENTION

The primary aspect of the invention is to provide a belt installation tool having a compact size.

Another aspect of the invention is to provide a belt installation tool having means for simultaneously adjusting a position of two pulleys by applying a torque to an arm.

Another aspect of the invention is to provide a belt installation tool having means for simultaneously adjusting a position of two pulleys by applying a torque to an arm through a short arcuate motion.

Another aspect of the invention is to provide a belt installation tool having a linkage to fix a tool position and thereby a pulley position.

Other aspects of the invention will be pointed out or made obvious by the following description of the invention and the accompanying drawings.

The invention comprises a belt installation tool. The tool comprises a pair of arms connected at a pivot. Each arm has an end for engaging a pulley axle. A handtool is engaged with an arm. By a torque applied with the handtool through a short arcuate motion to the arms, the pulleys are moved apart, thereby tensioning a belt. A locking member or linkage is available to fix the arms in a predetermined position.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 3 is a plan view of the inventive tool in use.

FIG. 4 is a plan view of an alternate embodiment.

FIG. 5 is a plan view of the inventive tool.

FIG. 6 is a plan view of an alternate embodiment.

FIG. 7 is a plan view of an alternate embodiment.

DETAILED DESCRIPTION OF THE PREFERRED EMBODIMENT

Figure 1:
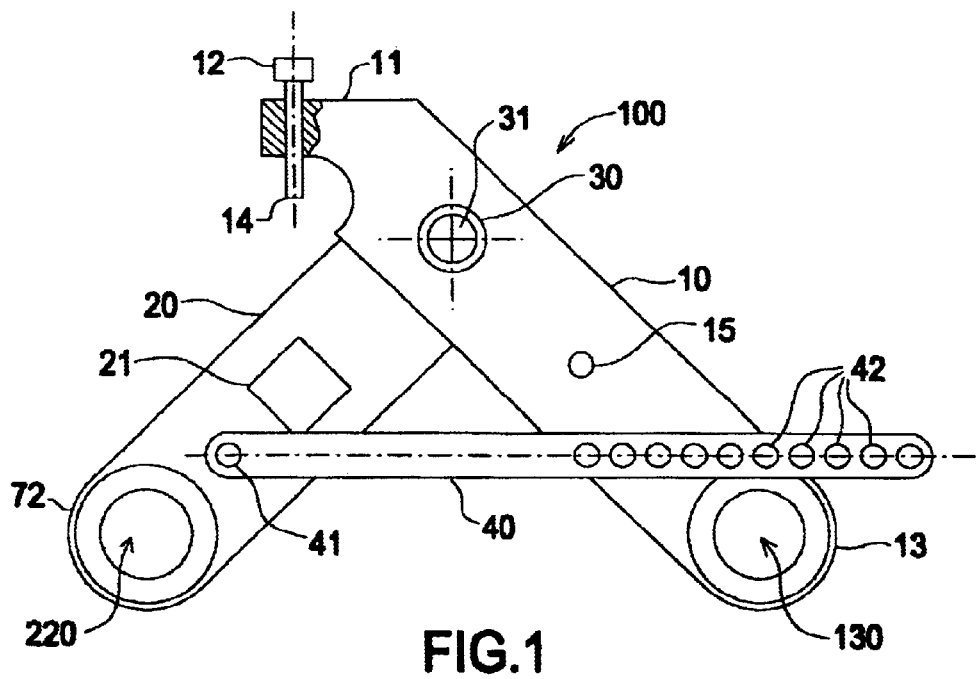
FIG. 1 is a plan view of the inventive tool.

FIG. 1 is a plan view of the inventive tool. The tool provides a simple and efficient means of adjusting a position of pulleys on a belt tensioning system by applying a torque through a short throw. During operation, the pulleys generally will have a spring force applied in order to tension a belt. The spring force must be countered to move a pulley opposite a tensioning direction, thereby allowing a belt to be installed and removed. This is accomplished by the inventive tool through means of two arms subjected to an applied torque.

Tool 100 comprises arm 10 and arm 20 pivotably connected at pivot 30. Pivot 30 comprises pin 31 to connect arms 10, 20. Arm 10 comprises pin 15 which engages any of a plurality of holes 42 in member or rod 40. Pin 15, when engaged with a hole 42, locks a relative position of arm 10 to arm 20.

Arm 10 also comprises member 11. Adjusting member 12 is threaded into member 11. As arms 10, 20 are moved apart, surface 14 of member 12 will come into contact with arm 20, thereby limiting a movement of arm 10 relative to arm 20. A movement of adjusting member 12 determines a maximum range of travel of the arms. Member 12 can be adjusted to set a maximum travel or separation for hole 220 and hole 130, which in turn sets a maximum movement for the pulleys being adjusted. This limits a belt tension during installation.

Arm 10 also comprises a collar 13. Collar 13 describes hole 130 for engaging an axle of a pulley (not shown—see FIG. 3). Arm 20 comprises a collar 22. Collar 22 describes hole 220 for engaging an axle of a pulley (not shown—see FIG. 3).

Member or rod 40 comprises holes 42 and pivot 41. Rod 40 is pivotably connected to arm 20 at pivot 41. Hole 31 is used to engage a handtool such as a ratchet wrench, not shown—see FIG. 5.

One can appreciate that the described components of the inventive tool may comprise any suitable, rigid metallic or non-metallic material. As further described herein, the tool is operated using a handtool with a short arcuate motion.

Figure 2:
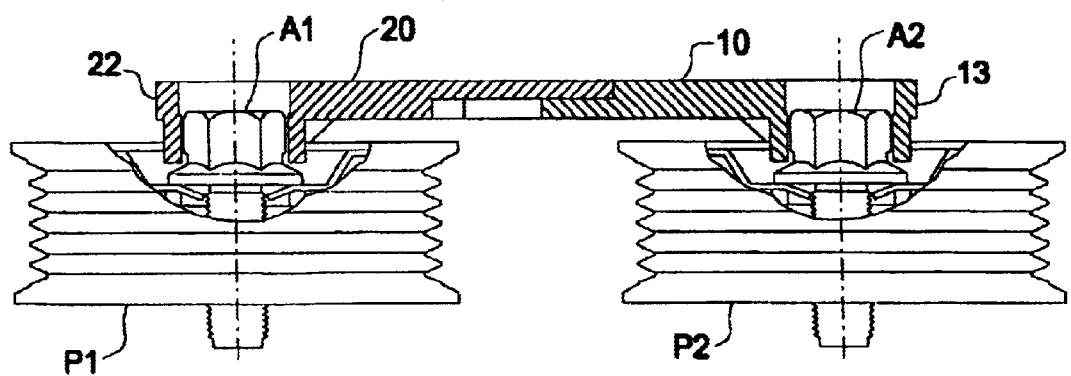
FIG. 2 is a side view of the tool engaged with pulleys.

FIG. 2 is a side view of the tool engaged with pulleys. Collar 22 and collar 13 are shown engaged with pulley axle A1 and A2 respectively. In this example, pulley axle A1 and A2 comprise bolts.

FIG. 3 is a plan view of the inventive tool in use. Collar 13 and 22 are engaged with pulley axles A1 and A2 respectively. Belt B is routed over pulleys P1 and P2. Pulleys P1 and P2 are normally pressed together by a spring (not shown) in order to properly tension a belt. In order to disengage (or engage) a belt B, pulleys P1 and P2 are moved from position 1' to position 2' by operation of the tool 100. See FIG. 5 for use of tool 100. Movement of the pulleys from position 1' to position 2' is counter to a spring force, thereby slackening a belt B, allowing it to be removed (or installed). One can appreciate that compact size and operational ease of the tool. It very minimally protrudes from the space in which the pulleys are disposed, making use very convenient for a user. Rod 40 is not shown for clarity.

FIG. 4 is a plan view of an alternate embodiment. This embodiment comprises hex head nut 60 which is fixed to arm 20 at pivot 30. A rotation of handtool HT, engaged with nut 60, in direction M spreads apart arms 10 and 20. For most installations, an arc through which movement M proceeds is approximately up to and including 90°, and in most cases less than approximately 180°. In this embodiment handtool HT comprises an open end wrench.

FIG. 5 is a plan view of the inventive tool. This embodiment comprises a tool hole 21 in arm 20. Handtool HT engages arm 20 through hole 21. A rotation of handtool HT in direction M spreads apart arms 10 and 20. In this embodiment handtool HT comprises a ratchet wrench. Spreading of arms 10 and 20 has the effect of moving pulleys P1 and P2 apart, countering a spring force and thereby slackening a belt B. See FIG. 3. For most installations, an arc through which movement M proceeds is approximately up to and including 90°, and in most cases less than approximately 180°.

FIG. 6 is a plan view of an alternate embodiment. This embodiment comprises tab 28 on arm 20. Handtool HT engages tab 28 to impart a torque to arm 20. In this embodiment handtool HT comprises an open end wrench. Holes 82 in arm 10 act as a locking member. The holes are arranged in a circular pattern about pivot 30. A pin 83 is inserted through hole 82 to engage a matching hole 84 in arm 20. The pinned, aligned pair of holes 82, 84 fix a position of arm 20 relative to arm 10. For most installations, an arc through which movement M proceeds is approximately up to and including 90°, and in most cases less than approximately 180°.

FIG. 7 is a plan view of an alternate embodiment. This embodiment comprises tab 28 on arm 20. Handtool HT engages tab 28 to impart a torque to arm 20 by a movement in direction M. In this embodiment handtool HT comprises an open end wrench. For most installations, an arc through which movement M proceeds is approximately up to and including 90°, and in most cases less than approximately 180°.

Although forms of the invention have been described herein, it will be obvious to those skilled in the art that variations may be made in the construction and relation of parts without departing from the spirit and scope of the invention described herein.

We claim:

1. A tool comprising:
   a first arm pivotably connected to a second arm;
   the first arm having a pulley engaging portion;
   the second arm having a pulley engaging portion;
   a member for fixing a first arm position relative to a second arm position, the member having a pivotable connection to a first arm and the member pinably connectable to the second arm; and
   the first arm having a wrench receiving portion whereby a torque is applied by a wrench to the first arm.

2. The tool as in claim 1 further comprising:
   an adjusting member for limiting a relative movement of the first arm and the second arm.

3. The tool as in claim 2, where the adjusting member comprises a screw, the screw adjustably engaged with the second arm and disposed to bear upon the first arm.

4. The tool as in claim 1, wherein the wrench receiving portion comprises a tab extending from the first arm.

5. The tool as in claim 1, wherein the wrench receiving portion comprises a hole in the first arm.

6. The tool as in claim 1, wherein the wrench receiving portion comprises a nut.

7. The tool as in claim 1, wherein the member comprises pairs of alignable holes in the first arm and the second arm, whereby a pin is inserted through a pair of holes to fix a first arm and second arm position.

8. A tool comprising:
   a first arm pivotably connected to a second arm;
   the first arm having a collar to removably engage a pulley axle;
   the second arm having a collar to removeably engage a pulley axle;
   the first arm having a wrench receiving portion whereby a torque is applied by a wrench to the first arm;
   a member for fixing a first arm position relative to a second arm position the member having a pivotable connection to a first arm and the member pinably connectable to the second arm; and
   a screw adjustably engaged to the second arm and disposed to bear upon the first arm, the screw limiting a relative movement of the first arm with respect to the second arm.

9. The tool as in claim 8, wherein the member comprises a hole alignable with a cooperating hole in the second arm, whereby a pin is inserted through the hole in the member and through the hole in the second arm to fix a first arm and second arm position.

10. The tool as in claim 9 further comprising a wrench receiving portion whereby a torque is applied by a wrench to the first arm.

* * * * *